(12) United States Patent
Umeda (10) Patent No.: US 11,981,269 B2
(45) Date of Patent: May 14, 2024

(54) VEHICLE INTERIOR MEMBER AND VEHICLE INTERIOR MEMBER MANUFACTURING METHOD

(71) Applicant: NIFCO INC., Yokosuka (JP)

(72) Inventor: Kenji Umeda, Yokosuka (JP)

(73) Assignee: NIFCO INC., Yokosuka (JP)

( * ) Notice: Subject to any disclaimer, the term of this patent is extended or adjusted under 35 U.S.C. 154(b) by 287 days.

(21) Appl. No.: 17/618,639

(22) PCT Filed: Jun. 16, 2020

(86) PCT No.: PCT/JP2020/023513
§ 371 (c)(1),
(2) Date: Dec. 13, 2021

(87) PCT Pub. No.: WO2020/262094
PCT Pub. Date: Dec. 30, 2020

(65) Prior Publication Data
US 2022/0258680 A1    Aug. 18, 2022

(30) Foreign Application Priority Data
Jun. 26, 2019   (JP) ................... 2019-118244

(51) Int. Cl.
*B60R 13/02* (2006.01)
*B29C 45/37* (2006.01)
(Continued)

(52) U.S. Cl.
CPC ........ *B60R 13/0256* (2013.01); *B29C 45/372* (2013.01); *B60K 37/00* (2013.01);
(Continued)

(58) Field of Classification Search
CPC .... B29K 2995/0018; B29K 2995/0094; B60K 37/00; B60K 2370/39; B60R 13/02; B60R 13/0243; B60R 13/0256; B60R 13/0262
(Continued)

(56) References Cited

U.S. PATENT DOCUMENTS 4,756,603 A * 7/1988 Ohtani ................... G02B 5/045
359/601
5,316,359 A    5/1994 Lansinger
(Continued)

FOREIGN PATENT DOCUMENTS

DE    102008044972 A1 * 3/2010 ............ B60K 37/00
JP    H04-138419 A    5/1992
(Continued)

OTHER PUBLICATIONS

English translation of JP HO4-83853; retrieved Dec. 12, 2023 via J-Plat-Pat located at https://www.j-platpat.inpit.go.jp/. (Year: 2023).*
(Continued)

*Primary Examiner* — Jason S Daniels
(74) *Attorney, Agent, or Firm* — Manabu Kanesaka (57) ABSTRACT

Provided is a vehicle interior member that can suppress the reflection of light to the outside, and that can reduce glare from whatever angle a passenger views the interior member. A cross-section of a groove 6 formed in a vehicle interior member 4 is substantially V-shaped, and is constituted by two flat surfaces, a first reflection surface 7 and a second reflection surface 8. The groove 6 has a groove angle θ of 32 degrees, and the reflectance at a light receiving surface 5 is no more than 2.0%.

5 Claims, 4 Drawing Sheets

(51) Int. Cl.
   *B60K 37/00* (2006.01)
   *B29L 31/30* (2006.01)

(52) U.S. Cl.
   CPC ...... *B60R 13/02* (2013.01); *B29K 2995/0094* (2013.01); *B29L 2031/3008* (2013.01); *B29L 2031/3014* (2013.01)

(58) Field of Classification Search
   USPC .......................................................... 296/70
   See application file for complete search history.

(56) References Cited

U.S. PATENT DOCUMENTS

| | | | | |
|---|---|---|---|---|
| 5,647,629 | A * | 7/1997 | Collins | B60J 1/2088 296/97.7 |
| 7,133,206 | B2 * | 11/2006 | Shibukawa | B60R 13/02 359/530 |
| 8,440,287 | B2 * | 5/2013 | Shimizu | B60R 13/0256 296/97.7 |
| 10,048,099 | B2 * | 8/2018 | Hattori | B44C 5/0453 |
| 2006/0006685 | A1 * | 1/2006 | Shibukawa | B60R 13/02 296/39.1 |
| 2010/0283283 | A1 * | 11/2010 | Takeda | B60H 1/00271 296/70 |
| 2014/0145252 | A1 | 5/2014 | Kim et al. | |
| 2022/0024095 | A1 * | 1/2022 | Nakano | B29C 45/372 |

FOREIGN PATENT DOCUMENTS

| | | |
|---|---|---|
| JP | H04-083853 U | 7/1992 |
| JP | 2006-011177 A | 1/2006 |
| WO | 2011/043117 A1 | 4/2011 |

OTHER PUBLICATIONS

PCT/ISA/210, "International Search Report for International Application No. PCT/JP2020/023513," dated Jul. 21, 2020.

* cited by examiner

FIG. 5

VEHICLE INTERIOR MEMBER AND VEHICLE INTERIOR MEMBER MANUFACTURING METHOD

RELATED APPLICATIONS

The present application is National Phase of International Application No. PCT/JP2020/023513 filed Jun. 16, 2020, and claims priority from Japanese Application No. 2019-118244, filed Jun. 26, 2019, the disclosure of which is hereby incorporated by reference herein in its entirety.

FIELD OF THE INVENTION

The present invention relates to a vehicle interior member and a vehicle interior member manufacturing method.

BACKGROUND OF THE INVENTION

Conventionally, for example, a vehicle is provided with a front glass, a sunroof grass, and door glasses, and light enters through these glasses. Light is necessary for vision, but causes glare. For example, when a reflection outer skin material disclosed in Patent Document 1 is provided on an instrument panel, sun light is absorbed to reduce glare for a passenger. In particular, the reflection outer skin material includes numerous grooves in section formed on the light reflecting surfaces and light absorbing surfaces, wherein the light absorbing surfaces absorb light reflected at the light reflecting surfaces.

PRIOR ART LITERATURE

Patent Document

Patent Document 1: Japanese Patent Publication No. 2006-11177

SUMMARY OF THE INVENTION

Problems to be Solved by the Invention

However, in the above reflection outer skin material, all of light reflected by the light reflecting surfaces is not directed to the light absorbing surfaces, but there is a case that the light which is not absorbed by the light absorbing surfaces causes glare to the passenger depending on an arrangement or a position where the passenger sees.

The present invention has been made in view of the above circumstances. Namely, it is an object of the invention to provide a vehicle interior member and a vehicle interior member manufacturing method, wherein reflection of light to outside is suppressed, and glare of light is reduced when a passenger sees from any angles.

Means for Solving the Problems

In order to attain the above object, a vehicle interior member of the invention includes, in a light receiving surface of a reflected portion on which light from outside is irradiated in the vehicle interior member, groove portions, each being formed, in a section, of two flat reflection surfaces facing each other, wherein a plane angle of the reflection surfaces is less than 65 degrees.

In the vehicle interior member of the invention, an angle of each of the reflection surfaces relative to a plane which is parallel to the light receiving surface and passes through an intersection of the reflection surfaces, is respectively different.

In a vehicle interior member of the invention, intersections at an opening of the groove and the reflection surfaces are located on a perpendicular line of the light receiving surface, and the reflection surfaces incline in opposite directions respectively relative to the perpendicular line.

In the vehicle interior member of the invention, at least one of the reflection surfaces includes a shallow surface portion which is a side close to the light receiving surface in a depth direction of the groove, and a deep surface portion which extends in the depth direction from the shallow surface portion, and a plane angle of the deep surface portion is smaller than that of the shallow surface portion.

In the vehicle interior member of the invention, a reflectance at the light receiving surface is less than 2.0%.

In the vehicle interior member of the invention, the plane angle is from 32 to 65 degrees.

In the vehicle interior member of the invention, in an upper surface portion of the light receiving surface directing upwardly in the vehicle, the reflection surface is directed to a direction crossing a length direction of the vehicle, and in an inner surface portion of the light receiving surface in the vehicle, the reflection surface is directed to a direction crossing the length direction of the vehicle.

In an vehicle interior member manufacturing method, a depth direction of the groove in the vehicle interior member is directed to a direction where a mold opens and closes in an injection molding.

Advantages of the Invention

A vehicle interior member of the invention includes, in a light receiving surface of a reflected portion on which light from outside is irradiated in the vehicle interior member, groove portions, each being formed of, in a section, two flat reflection surfaces facing each other, wherein a plane angle of the reflection surfaces is less than 65 degrees. Namely, when the plane angle of the reflection surfaces in the groove is less than 65 degrees, the light from outside reflected at the reflection surfaces of the groove reflects repeatedly, advances in the depth direction of the groove, attenuates and is absorbed. Accordingly, reflection of light to outside is suppressed, and it is possible to reduce the glare even when a passenger sees from any angle.

In the vehicle interior member of the invention, angles of the reflection surfaces relative to a plane which is parallel to the light receiving surface and passes through an intersection of the reflection surfaces, are respectively different. In this structure, even if the light comes from any direction, the light attenuates and is absorbed. Accordingly, reflection to outside is suppressed, and even if the passenger sees from any direction, glare feeling by the passenger can be reduced.

In the interior member of the invention, the intersection at the opening of the groove and the reflection surfaces is located on a perpendicular line of the light receiving surface, and the reflection surfaces incline in opposite directions respectively relative to the perpendicular line. For example, in case the vehicle interior member is manufactured by the injection molding, when the mold is opened, a portion corresponding to the intersection of the groove in the mold is drawn from the intersection to the opening through the perpendicular line. Namely, by drawing the mold linearly upwardly, the injection molding can be made. Incidentally, if the reflection surfaces incline in a same direction relative to the perpendicular line of the light receiving surface (the groove inclines relative to the perpendicular line), the mold cannot be drawn linearly upwardly.

In the vehicle interior member of the invention, at least one of the reflection surfaces includes a shallow surface portion which is a side close to the light receiving surface in a depth direction of the groove, and a deep surface portion which extends in the depth direction from the shallow surface portion, and a plane angle of the deep surface portion is smaller than that of the shallow surface portion. In this structure, the light reflected at the shallow surface portion repeatedly reflects at the deep surface portion, attenuates and is absorbed. Accordingly, the reflection of light to the outside is suppressed, and in case a passenger sees from any angle, glare felt by the passenger is reduced.

In the vehicle interior member of the invention, a reflectance at the light receiving surface is less than 2.0%. Accordingly, glare felt by the passenger is reduced.

In the vehicle interior member of the invention, the plane angle is from 32 to 65 degrees. Namely, in case the plane angle is from 32 to 65 degrees, the reflection of light to outside is reduced, and in case a passenger sees from any angle, glare felt by the passenger is reduced.

In the vehicle interior member of the invention, in an upper surface portion of the light receiving surface directing upwardly in the vehicle, the reflection surface is directed to a direction crossing a length direction of the vehicle, and an inner surface portion of the vehicle in the light receiving surfaces, the reflection surface is directed to a direction crossing the length direction of the vehicle. Namely, even if the reflection surfaces are directed to any direction, glare felt by the passenger is reduced.

In a vehicle interior member manufacturing method of the invention, a depth direction of the groove in the vehicle interior member is directed to a direction where a mold opens and closes in an injection molding. Accordingly, it is possible to easily manufacture the vehicle interior member by the injection molding using a mold.

DETAILED DESCRIPTION OF THE EMBODIMENTS

Figure 1:
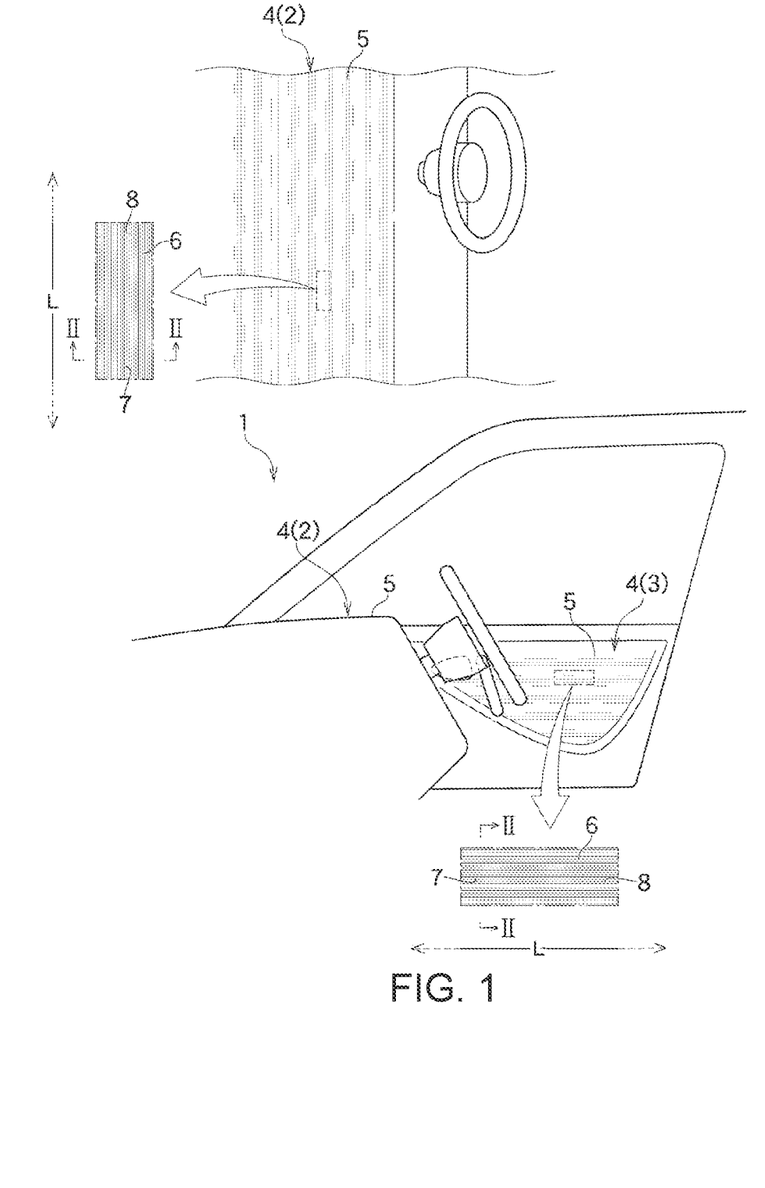
FIG. 1 is a general view of an interior of a vehicle where a vehicle interior member of the invention is applied.
Figure 2:
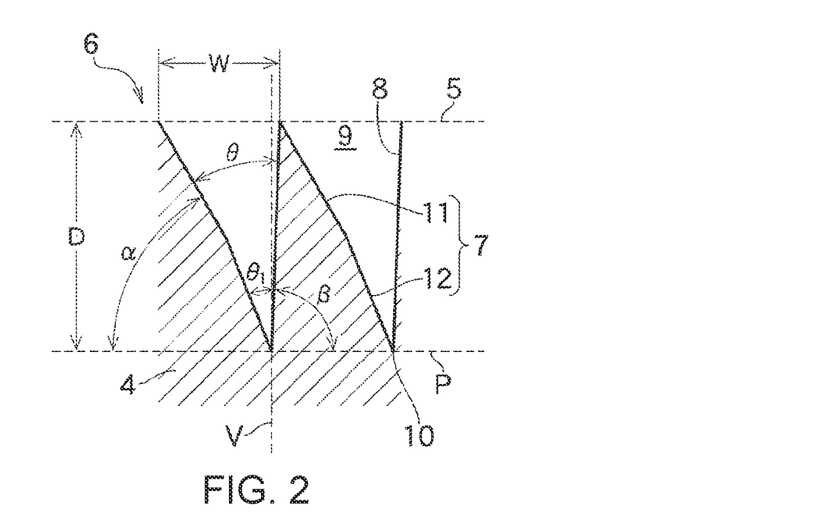
FIG. 2 is an enlarged sectional view of the vehicle interior member of the invention taken along line II-II in FIG. 1.
Figure 3:
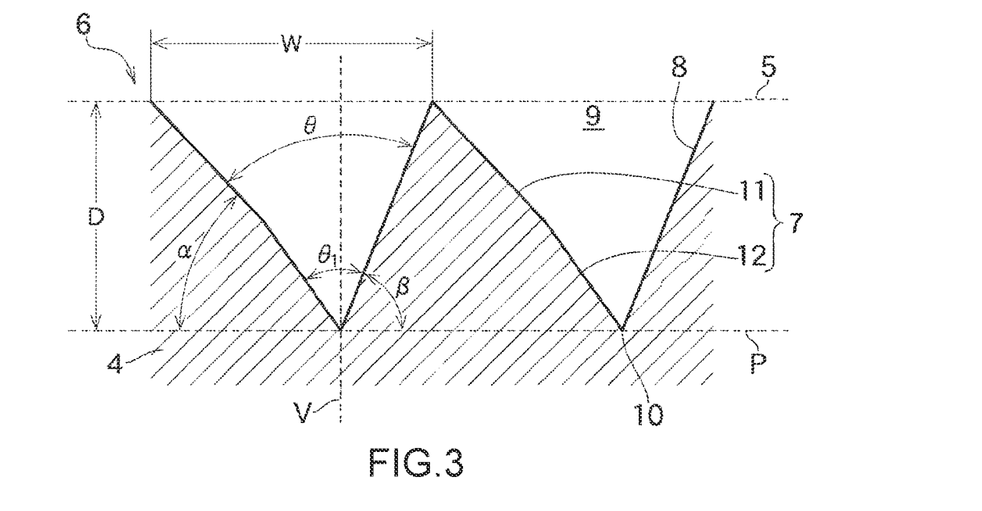
FIG. 3 is an enlarged sectional view of the vehicle interior member of the invention taken along line II-II in FIG. 1.

Hereinafter, the vehicle interior members of the embodiments of the invention will be explained based on the drawings. FIG. 1 generally shows an interior of a vehicle 1 where a vehicle interior member 4 is applied. FIGS. 2 and 3 show sections of the vehicle interior member 4. Incidentally, in FIGS. 1, 2, 3 and 4, grooves 6 of the vehicle interior member 4 are shown exaggeratedly in order to understand easily.

In FIG. 1, the vehicle interior member 4 is applied, in an interior of a vehicle, to an outer surface of an instrument panel 2 or a door trim 3 as an exposed portion to which light from an outside, such as sun or street lamp, is irradiated. Incidentally, the exposed portion includes, for example, computer periphery, console, pillar cover, rear parcel shelf, and vehicle camera cover (not shown in the drawings).

As shown in FIGS. 2 and 3, the vehicle interior member 4 is formed with countless grooves 6 on a light receiving surface 5 which is an outer surface, and the outer surface is zigzag. A section of the single groove 6 is generally a V-shape, and is formed with two plan reflection surfaces facing each other. Hereinafter, in the groove 6, one reflection surface is a first reflection surface 7; the other reflection surface is a second reflection surface 8; a distance between the respective reflection surfaces 7, 8 is a groove width W; a perpendicular line V direction of the light receiving surface 5 is a groove depth D; a plane angle between the respective reflection surfaces 7, 8 is a groove angle θ; an angle of the first reflection surface 7 relative to a parallel plane P which is an imaginary plane passing through a crossing point 10 of the respective reflection surfaces 7, 8 and is parallel to the light receiving surface 5 is a first outer angle α; an angle of the second reflection surface 8 relative to the parallel plane P is a second outer angle β; and a direction where the grooves 6 extend continuous is a groove length L (FIG. 1).

In the groove 6, the crossing point 10 at an opening 9 and the reflection surfaces 7, 8 is arranged on the perpendicular line V, wherein the respective reflection surfaces 7, 8 incline in opposite directions relative to the perpendicular line V. The first reflection surface 7 is bent, and includes a flat shallow surface portion 11 which is a side close to the light receiving surface 5 in a depth direction, and a flat deep surface portion 12 which extends to the depth direction from the shallow surface portion 11. In plane face angles of the respective reflection surfaces 7, 8, the deep surface portion 12 is smaller than that of the shallow surface portion 11 ($θ>θ_1$). These grooves 6 are countlessly arranged adjacent to each other in the groove width direction W.

Incidentally, the number of bend is arbitrary. Accordingly, for example, in case a number of bend is two, the first reflection surface 7 is formed of three surfaces, and in case a number of bend is three, the first reflection surface is formed of four surfaces. In this case, in the surfaces adjacent to each other, a surface relatively arranged at a shallow side becomes a shallow surface portion 11, and a surface relatively arranged at a deep side becomes a deep surface portion 12. Incidentally, each of the shallow surface portion 11 and a deep surface portion 12 may be bent once or plural times, and only the deep surface portion 12 may be bent once or plural times. Also, a number of bend may be different in each of the grooves 6 adjacent to each other in the groove width direction W, and the respective reflection surfaces 7, 8 may not bend, and may be flat continuously.

The groove width W is, for example, 30 micrometers. The groove depth D is, for example, from 10 to 500 micrometers. In case the groove depth D is less than 10 micrometers, there is a chance of a mold release failure in molding, and on the other hand, in case the groove depth D is more than 500 micrometers, the projections and grooves of the surfaces of the irradiated portion become remarkable, so that the surfaces are not proper in visual and feeling. The groove angle θ is less than 65 degrees, and in concrete, from 32 to 65 degrees. The first angle α and the second angle β are respectively different, and generally 1:1 to 1:1.46. For example, the groove angle θ is 32 degrees, and in case the first angle α and the second angle β are 1:1.46, the first angle α is 60.1 degrees, and the second angle β is 87.9 degrees. As shown in FIG. 3, in case the groove angle θ is 65 degrees, the first outer angle α is about 46.7 degrees, and the second outer angle β is 68.3 degrees. In this structure, a reflectance at the light receiving surface 5 becomes less than 2.0%. The width length L is designed according to the shape of the reflected portion, and extends from one side to the other side continuously (refer to FIG. 1).

The directions of the respective reflection surfaces 7, 8 are arbitrary, and as shown in FIG. 1, for example, in the light receiving surface 5 of the instrument panel 2 which is directed upwardly in the vehicle among the irradiated surfaces, the respective reflection surfaces 7, 8 are directed to the length direction of the vehicle 1. Also, for example, in the light receiving surface 5 of the door trim which is a member directed inwardly in the vehicle 1 among the irradiated surfaces, the respective reflection surfaces 7, 8 are directly perpendicular to the length direction of the vehicle 1.

In other words, the direction of the groove length L in the former is from one end to another end in the vehicle width direction of the instrument panel 2, and the direction of the groove length L in the latter is from one end to another end in the vehicle length direction of the door trim 3.

Figure 4:
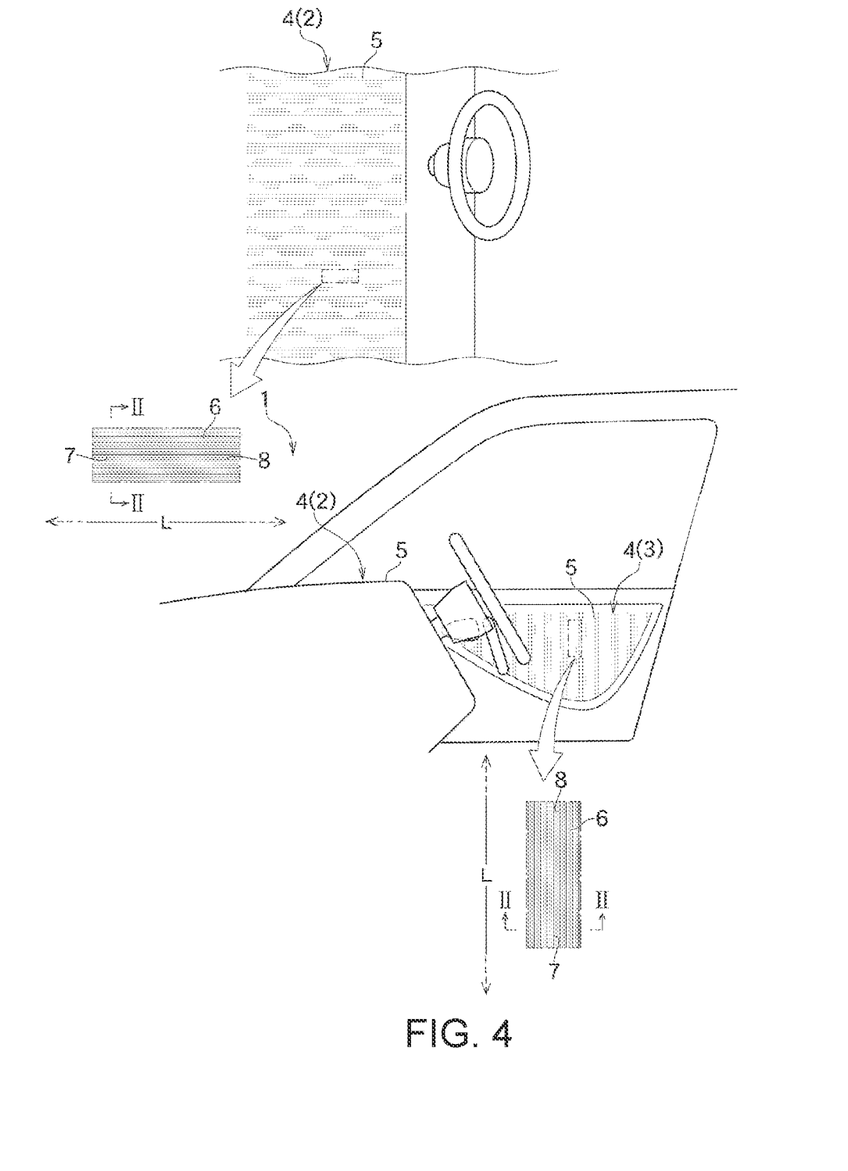
FIG. 4 is a general view of an interior of a vehicle where a vehicle interior member of another embodiment is applied.

Also, as shown in FIG. 4, for example, in the light receiving surface 5 of the instrument panel 2, the respective reflection surfaces 7, 8 may be directed to a direction crossing the vehicle length direction. For example, in the light receiving surface 5 of the door trim 3, the respective reflection surfaces 7, 8 may be directed to the vehicle length direction.

In other words, the direction of the groove length L in the former is from one end to another end in the vehicle length direction of the vehicle 1 in the instrument panel 2, and the direction of the groove length L in the latter is from one end to another end of the vehicle height direction of the vehicle 1 in the door trim 3.

Further, the directions of the respective reflection surfaces 7, 8 (or the direction of the groove length L) may be different at the respective reflected portions, and may be different at each of desired areas in the reflected portion. Also, the directions of the reflection surfaces 7, 8 may cross or incline relative to the length direction, vehicle width direction and vehicle height direction.

The vehicle interior member 4 is made of a synthetic resin, such as vinyl chloride, polypropylene, polyester, poly carbonate, ABS (Acrylonitril Butadiene Styrene), acrylic resin and so on. A color of the vehicle interior member 4 is, for example, a black group, but it may be other color. The vehicle interior member 4 may be applied later on the instrument panel 3 molded beforehand, or also, be integrally molded by an injection molding. In a mold (not shown) in the injection molding, in case the mold has, for example, two plates, a movable mold has a jig zag shape according to the groove 6. The depth direction of the groove 6 is oriented to a direction where the movable mold opens and closes.

As explained above, the vehicle interior member is formed. Next, advantages of the embodiments are explained.

As explained above, the cross section of the groove 6 formed in the vehicle interior member 4 has generally a V-shape, and is formed by two flat first reflection surface 7 and second reflection surface 8. The groove 6 has a groove angle θ from 32 to 65 degrees, and the first outer angle α and the second outer angle β with a ratio of 1:1 to 1.46. In this structure, the reflectance at the light receiving surface 5 becomes less than 2.0%. Namely, in case the groove angle θ in the groove 6 is between 32 to 65 degrees, while outside light reflected by the respective reflection surfaces 7, 8 of the groove 6 reflects repeated, the outside light advances to the depth direction of the groove 6, attenuates and is absorbed. Accordingly, it is possible to suppress the reflection of light to outside, and to reduce glare that a passenger feels if the passenger sees from any angle. Also, in case the first outer angle α and the second outer angle β are asymmetrical relative to the perpendicular line, it is possible to control the reflection direction not to direct to the passenger.

In the groove 6 of the vehicle interior member 4, the intersection 10 at the opening portion 9 and the reflection surfaces 7, 8 is arranged on the perpendicular line V, and the respective reflection surfaces 7, 8 face each other and incline in the opposite directions. The depth direction of the groove 6 is directed to the direction where the mold opens. In this structure, in case the vehicle interior member 4 is formed by the injection molding, when the mold is opened, the portion corresponding to the intersection 10 in the groove 6 of the mold is drawn from the intersection 10 to the open potion 9 through the perpendicular line V. Namely, since the mold can be drawn linearly, the injection molding can be made easily.

The first reflection surface 7 of the vehicle interior member 4 bends, and includes the shallow surface portion 11 which is a near side to the light receiving surface 5 in the depth direction of the groove 6, and the plane deep surface portion 12 which extends in the depth direction from the shallow surface portion 11. In the plane face angles of the respective reflection surfaces 7, 8, the angle in the deep surface portion 12 is smaller than that in the shallow surface portion 12. In this structure, the light from outside reflected by the shallow surface portion 11 repeats further reflections at the deep surface portion 12, attenuates and is absorbed. Accordingly, the reflection of light to outside is suppressed, and even if the passenger sees from any angle, flare felt by the passenger is reduced.

In the vehicle interior member 4, the directions of the reflections surfaces 7, 8 are arbitrary, and for example, the direction in the groove length L may be a vehicle width direction or a vehicle length direction in the instrument panel 2, and may be a vehicle length direction or vehicle height direction in the door trim 3. Namely, even if the respective reflection surfaces 7, 8 are directed in any directions, it is possible to reduce glare felt by the passenger.

Next, examples of the invention are explained.

EXAMPLES

In regard to examples and comparative example, Inspections 1, 2 and 3 are made. In each inspection, an ultraviolet lay visible near infrared spectrometer (made by Shimadzu Corporation, SolidSpec-3700) is used. In the Inspections 1 and 2, relative all ray measurement is made, and in the Inspection 3, absolute reflectance by positive reflection is measured. Incidentally, relative all ray measurement follows JISK 7375.

Inspection 1

Figure 5:
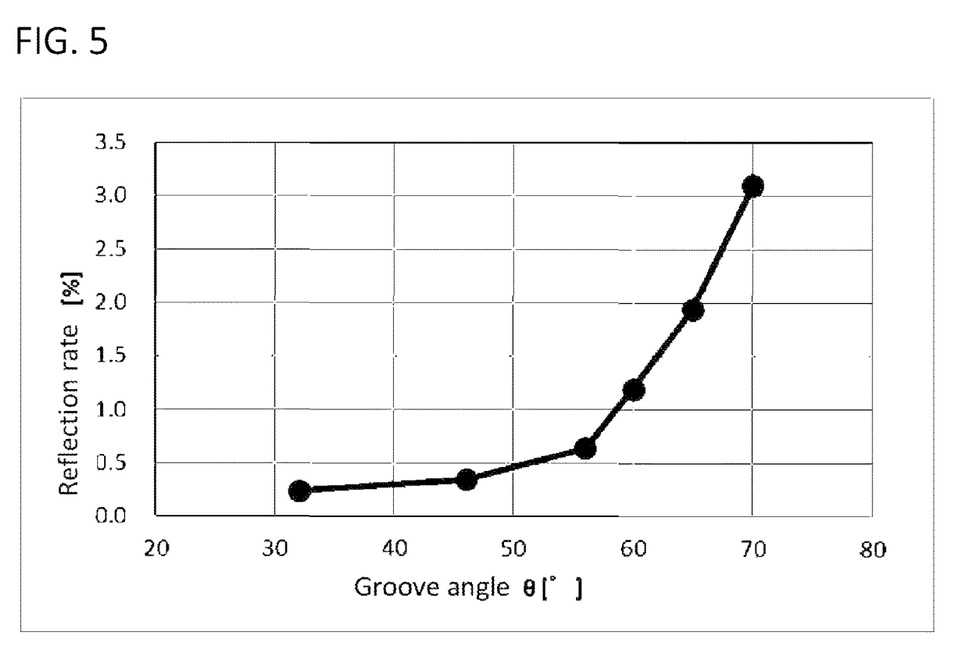
FIG. 5 is a graph showing reflectance of Examples 1-5 and a comparative Example.

In Inspection 1, Examples 1-5 different respectively in the groove angles θ and a Comparative Example are measured. The reflectance in the Examples and the comparative example are shown in the following Table 1. The reflectance for the Examples is shown in FIG. 5.

TABLE 1

|  | Example 1 | Example 2 | Example 3 | Example 4 | Example 5 | Comparative example |
|---|---|---|---|---|---|---|
| Groove angle θ [°] | 32 | 46 | 56 | 60 | 65 | 70 |
| First outer angle α [°] | 60 | 54.5 | 50 | 48.8 | 46.7 | 44.7 |
| Second outer angle β [°] | 88 | 79.5 | 74 | 71.2 | 68.3 | 65.3 |
| Reflectance [%] | 0.24 | 0.35 | 0.64 | 1.20 | 1.94 | 3.10 |

Groove depth D = 50 μm,
α:β = 1:1.46

From the above results, when the groove angle θ is between 32 to 65 degrees, the reflectance is less than about 2.0

Inspection 2

In Inspection 2, Examples 6-8 which have different groove depths D are formed are measured. The specification and reflectance are shown in the following Table 2.

TABLE 2

|  | Example 6 | Example 7 | Example 8 |
|---|---|---|---|
| Groove depth D [μm] | 10 | 50 | 300 |
| Reflectance [%] | — | 0.3 | 0.3 |

Groove angle θ, First outer angle α and Second outer angle β are the same as those in Example 1.

From the above results, in the range of the Inspection 2, the groove depth D does not affect the reflectance.

Inspection 3

In Inspection 3, Examples and comparative Example same as Inspection 1 are measured. The absolute reflectance in incident 20 to 160 degrees (incident angle 70 to minus 70 degrees) which is an angle on the basis of a light receiving surface are shown in the following Table 3.

TABLE 3

|  | Example 1 | Example 2 | Example 3 | Example 4 | Example 5 | Comparative example |
|---|---|---|---|---|---|---|
| Incident 20 degrees | 0.11% | 0.19% | 0.12% | 0.34% | 0.92% | 2.13% |
| Incident 40 degrees | 0.02% | 0.02% | 0.03% | 0.02% | 0.10% | 1.12% |
| Incident 60 degrees | 0.02% | 0.01% | 0.01% | 0.02% | 0.03% | 0.50% |
| Incident 80 degrees | 0.01% | 0.01% | 0.02% | 0.02% | 0.01% | 0.20% |
| Incident 100 degrees | 0.02% | 0.02% | 0.01% | 0.01% | 0.01% | 0.30% |
| Incident 120 degrees | 0.02% | 0.02% | 0.02% | 0.02% | 0.04% | 0.34% |
| Incident 140 degrees | 0.02% | 0.06% | 0.12% | 0.18% | 0.20% | 0.80% |
| Incident 160 degrees | 0.10% | 0.23% | 0.23% | 0.45% | 0.80% | 1.98% |

From the above results, in the various angles of the incident lights, it is recognized that the reflectance is less than 2.0%.

As above, the examples of the invention are explained, the present invention is not limited to the above examples. And, in the present invention, various design modifications can be made without departing the items defined in the claims.

EXPLANATION OF NUMERALS

1: Vehicle
2: Instrument panel (Reflected portion)
3: Door trim (Reflected portion)
4: Vehicle interior member
5: Light receiving surface
6: Groove
7: First light reflection surface
8: Second light reflection surface
9: Opening portion
10: Intersection
11: Shallow surface portion
12: Deep surface portion
W: Groove width
Θ: Groove angle
V: Perpendicular line
D: Groove depth
L: Groove length
P: Parallel plane
α: First outer angle
β: Second outer angle

What is claimed is:

1. A vehicle interior member, comprising:
a reflected portion with a light receiving surface on which light from outside is irradiated in a vehicle interior member, and
groove portions formed in the light receiving surface, each being formed of, in a section, two flat reflection surfaces facing each other,
wherein a plane angle between the reflection surfaces is less than 65 degrees,
an intersection between the reflection surfaces in one groove portion is located on a perpendicular line of the light receiving surface,
the reflection surfaces incline in opposite directions respectively relative to the perpendicular line,
an angle of one reflection surface relative to a plane which is parallel to the light receiving surface and passes through the intersection of the reflection surfaces, is different from another reflection surface relative to the plane,
the one reflection surface has an angle relative to the plane smaller than an angle of the another refection surface relative to the plane,
the one reflection surface includes a shallow surface portion which is a side close to the light receiving surface in a depth direction of the groove, and a deep surface portion which extends in the depth direction from the shallow surface portion, and a plane surface angle of the deep surface portion relative to the another reflection surface is smaller than that of the shallow surface portion relative to the another reflection surface.

2. A vehicle interior member according to claim 1, wherein references at the light receiving surfaces are less than 2.0%.

3. A vehicle interior member according to claim 1, wherein the plane angle is from 32 to 65 degrees.

4. A vehicle interior member according to claim 1, wherein in an upper surface portion of the vehicle, the reflection surface is directed to a length direction of the vehicle, and in an inner surface portion of the vehicle, the reflection surface is directed to a direction crossing the length direction of the vehicle.

5. A vehicle interior member manufacturing method, wherein a depth direction of the groove in the vehicle interior member according to claim 1 is directed to a direction where a mold opens and closes in an injection molding.

\* \* \* \* \*